(12) United States Patent
Dennett et al.

(10) Patent No.: US 11,096,394 B2
(45) Date of Patent: Aug. 24, 2021

(54) CONTROLLED ATMOSPHERIC STUNNING

(71) Applicant: Linco Food Systems A/S, Trige (DK)

(72) Inventors: Steven Paul Dennett, Norfolk (GB); George Douglas Morgan, Brandon, MS (US); Oliver Hahn, Parkville, MO (US); Douglas Bryan Barnett, Olathe, KS (US); Gerald Kent Lauer, Lee's Summit, MO (US); Joshua James Gillespie, Smithville, MO (US)

(73) Assignee: Baader Linco, Inc., Trige (DK)

( * ) Notice: Subject to any disclaimer, the term of this patent is extended or adjusted under 35 U.S.C. 154(b) by 589 days.

(21) Appl. No.: 15/949,697

(22) Filed: Apr. 10, 2018

(65) Prior Publication Data

US 2018/0289022 A1  Oct. 11, 2018

Related U.S. Application Data

(60) Provisional application No. 62/483,550, filed on Apr. 10, 2017.

(51) Int. Cl.
*A22B 3/00* (2006.01)

(52) U.S. Cl.
CPC ................... *A22B 3/005* (2013.01)

(58) Field of Classification Search
CPC ................. A22B 3/00; A22B 3/005
USPC .......................................... 452/66
See application file for complete search history.

(56) References Cited

U.S. PATENT DOCUMENTS

| | | | |
|---|---|---|---|
| 5,152,714 A * | 10/1992 | Audsley | A22B 3/00 452/66 |
| 5,487,699 A * | 1/1996 | Tyrrell | A22B 3/00 452/66 |
| 5,643,072 A | 7/1997 | Lankhaar et al. | |
| 6,126,534 A | 10/2000 | Jacobs et al. | |
| 6,174,228 B1 | 1/2001 | Grimsland et al. | |
| 6,348,227 B1 | 2/2002 | Caracciolo, Jr. | |
| 6,848,987 B2 | 2/2005 | Draft | |
| 7,488,943 B2 * | 2/2009 | Rose | G01T 1/1648 250/363.04 |
| 8,272,926 B2 * | 9/2012 | Lang | A22B 3/086 452/66 |
| 8,323,080 B2 * | 12/2012 | Lang | A22B 3/005 452/66 |
| 9,017,152 B2 | 4/2015 | Zanotti | |

(Continued)

FOREIGN PATENT DOCUMENTS

WO  1994-27425  12/1994

OTHER PUBLICATIONS

International Search Report and Written Opinion dated Jun. 27, 2018 in PCT/US2018/026929, international filing date Apr. 10, 2018, 16 pgs.

(Continued)

*Primary Examiner* — Richard T Price, Jr.
(74) *Attorney, Agent, or Firm* — Spencer Fane LLP

(57) ABSTRACT

A gas stunning apparatus and system includes a first environment and a second environment. An animal is passed through the first environment until the carbon dioxide concentration within the first environment is about 40%, rendering the animal unconscious. The animal is then passed through the second environment until the carbon dioxide concentration within the second environment is about 100%, rendering the animal irrevocably unconscious.

7 Claims, 9 Drawing Sheets

(56) References Cited

U.S. PATENT DOCUMENTS

| | | | |
|---|---|---|---|
| 9,826,745 B2 | 11/2017 | Thulin et al. | |
| 2005/0191953 A1* | 9/2005 | Ovesen .................... | A22B 3/00 |
| | | | 452/66 |
| 2006/0154585 A1* | 7/2006 | Kildegaard .............. | A22B 3/00 |
| | | | 452/66 |
| 2006/0183414 A1* | 8/2006 | Zachariassen ......... | A22B 3/005 |
| | | | 452/66 |
| 2008/0254727 A1* | 10/2008 | Lang ...................... | A22B 3/086 |
| | | | 452/66 |
| 2014/0342647 A1* | 11/2014 | Zanotti .................. | A22B 3/005 |
| | | | 452/57 |
| 2015/0250192 A1* | 9/2015 | Thulin ............... | G01N 33/0067 |
| | | | 452/57 |
| 2016/0165902 A1* | 6/2016 | Zanotti .................. | A22B 3/005 |
| | | | 452/66 |
| 2017/0231237 A1* | 8/2017 | Cheek .................... | A22B 3/005 |
| | | | 452/66 |

OTHER PUBLICATIONS

European Search Report and Search Opinion dated Dec. 7, 2020 in European application EP 18785193.6 filed Apr. 10, 2018, 11 pgs.

* cited by examiner

CONTROLLED ATMOSPHERIC STUNNING

BACKGROUND

Field of the Invention

The present disclosed subject matter relates generally to controlled atmospheric stunning of animals, in particular, the reversible and irreversible stunning of poultry prior to processing.

Background

Conventional animal processing methods utilize controlled atmospheric stunning to irreversibly stun an animal prior to additional processing the animal for ultimate consumption. Various gases and mixtures of gases are used during the stunning process. Animals are transported into a single structure containing the gases in a gradient of concentration for a period of time allowing the animal to succumb to the effects of the gases and reach a state of irreversible stunning, thereby allowing the animal to be processed by hand or machine.

Disadvantageously, the conventional processing methods stress the animals, and result in unwanted injury or damage to the animals. Further, conventional processing methods require a particular arrangement of apparatuses and structures that have undesirable costs and features, and lack flexible application and implementation. Previously there has not been available a controlled atmospheric stunning apparatus, system, and method with the advantages and features of he disclosed subject matter.

SUMMARY

In the controlled atmospheric stunning apparatus, system, and method of the disclosed subject matter, animals pass through a first environment with a first stunning gas to achieve unconsciousness followed by optionally a second environment with a second stunning gas to achieve irreversible unconsciousness. Segregating the stunning process into two phases decreases the distance of vertical travel through the gases required to render the animals unconscious and irreversibly unconscious, and increases control of the process thereby minimizing unwanted stress of the animals and minimizing damage to the animals. Further, the distance the animals travel through the first phase is less than the distance of travel in the sole structure used in conventional methods allowing the first and second phases to be above ground, partially above ground, or completely below ground, thereby reducing construction and operating costs, and allowing greater adaptability to existing facilities.

BRIEF DESCRIPTION OF THE DRAWINGS

The drawings constitute a part of this specification and include exemplary embodiments of the disclosed subject matter and illustrate various objects and features thereof.

DETAILED DESCRIPTION

Figure 1:
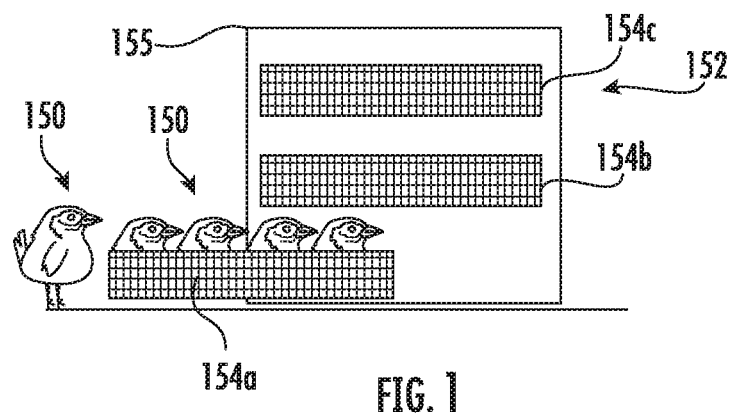
FIG. 1 is an elevation view of an exemplary module with animals loaded into crates.

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Certain terminology will be used in the following description, and are shown in the drawings, and will not be limiting. For example, up, down, front, back, right and left refer to the disclosed subject matter as orientated in the view being referred to. The words, "inwardly" and "outwardly" refer to directions toward and away from, respectively, the geometric center of the aspect being described and designated parts thereof. Forward, rearward, upward, and downward are generally in reference to the direction of travel, if appropriate. Said terminology will include the words specifically mentioned, derivatives thereof and words of similar meaning.

Referring to FIGS. 1-11, a controlled atmospheric stunning system 100 for stunning an animal prior to slaughter is shown and described whereby the animals travel through a first environment, and optionally a second environment. Animals are gathered at their place of origin and transported to a processing facility where the animals are stunned prior to slaughter.

Figure 2:
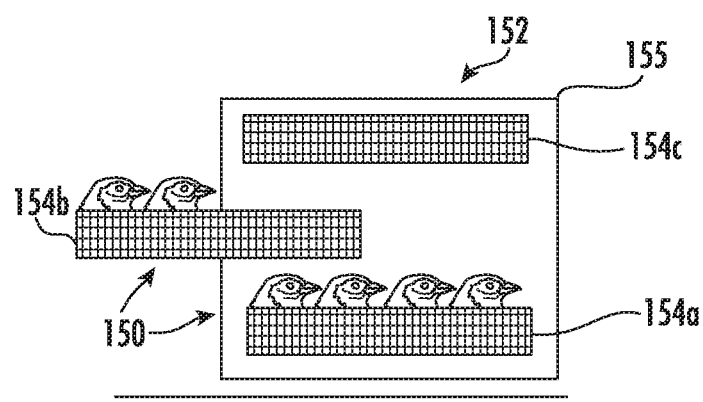
FIG. 2 is an elevation view of an exemplary module with animals loaded into crates.
Figure 3:
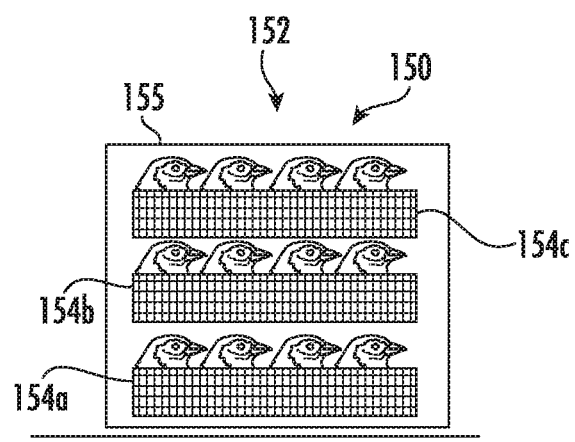
FIG. 3 is an elevation view of an exemplary module with animals loaded into crates forming a module.

Referring to FIGS. 1-3, animals 150, such as poultry, are placed in crates 154 assembled into modules 152 at the place of origin, such as a farm, for transportation to the processing facility. The crates 154 have sidewalls and a bottom wall for containing the animals 150 with openings to allow airflow. For example, a first upwardly open crate 154a is placed at the bottom of a frame 155 allowing a worker to gather and place an animal 150 into the first crate 154a, and fill the crate 154a with a number of animals 150. Once the first crate 154a is filled, it is pushed into the frame 155 and a second crate 154b is placed within the frame 155 above the first crate 154a. The second crate 154b forms the roof of the first crate 154a and is loaded in the same manner as the first crate 154a. The third crate 154c is placed above the second crate 154b and loaded in the same manner as crates 154a and 154b. The process is repeated until all of the crates 154 of the module 152 are filled. Thereafter, one or more modules 152 filled with animals 150 in crates 154 are arranged on a truck for transport to reception 170 at the processing facility. From reception 170 the animals 150 may proceed directly to module unloading 174, or first proceed to lairage 172 for a period of time. Lairage 172 allows the animals 150 to calm and become comfortable with the new environment after being transported from the place of origin. The animals 150 move from lairage 172 to module unloading 174. From module unloading 174 the animals 150 move to stunning 176. From stunning 176 the animals move to slaughtering 182.

Figure 4:
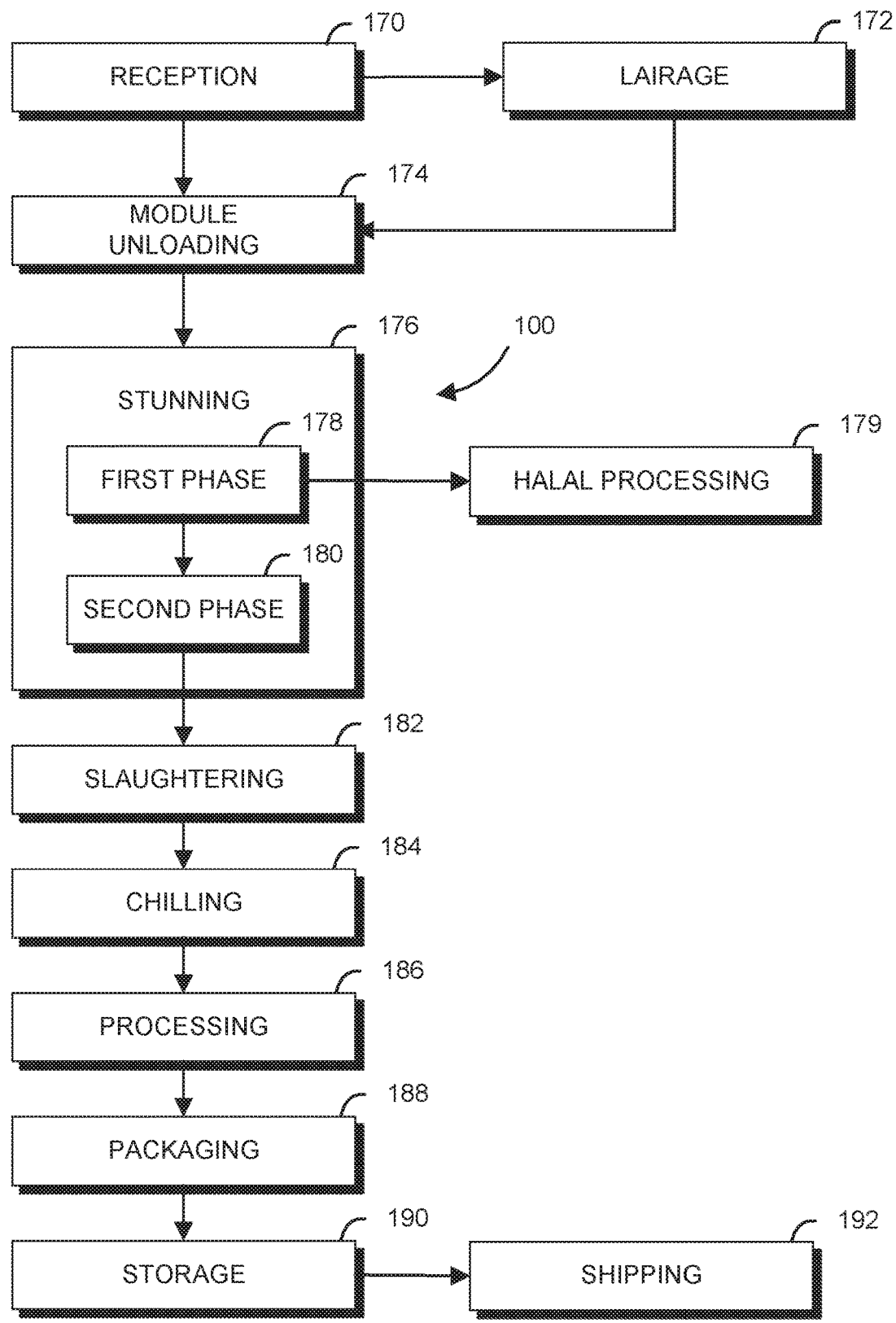
FIG. 4 is a schematic of an exemplary processing facility.
Figure 5:
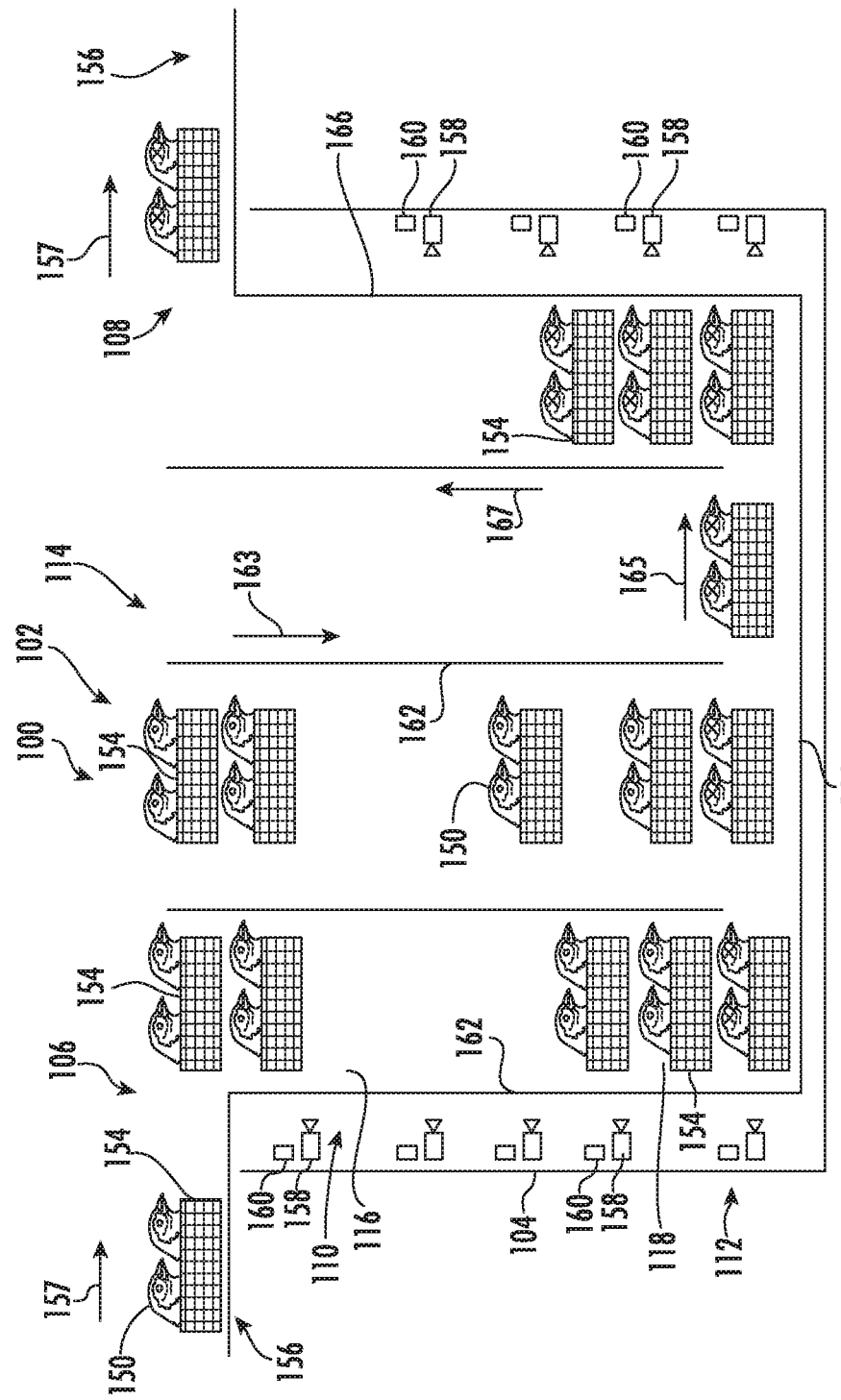
FIG. 5 is an elevation view of an embodiment of an environment of the disclosed subject matter.

The general stages of an embodiment of an exemplary processing facility are shown in FIGS. 4-5 and are described below.

Figure 6:
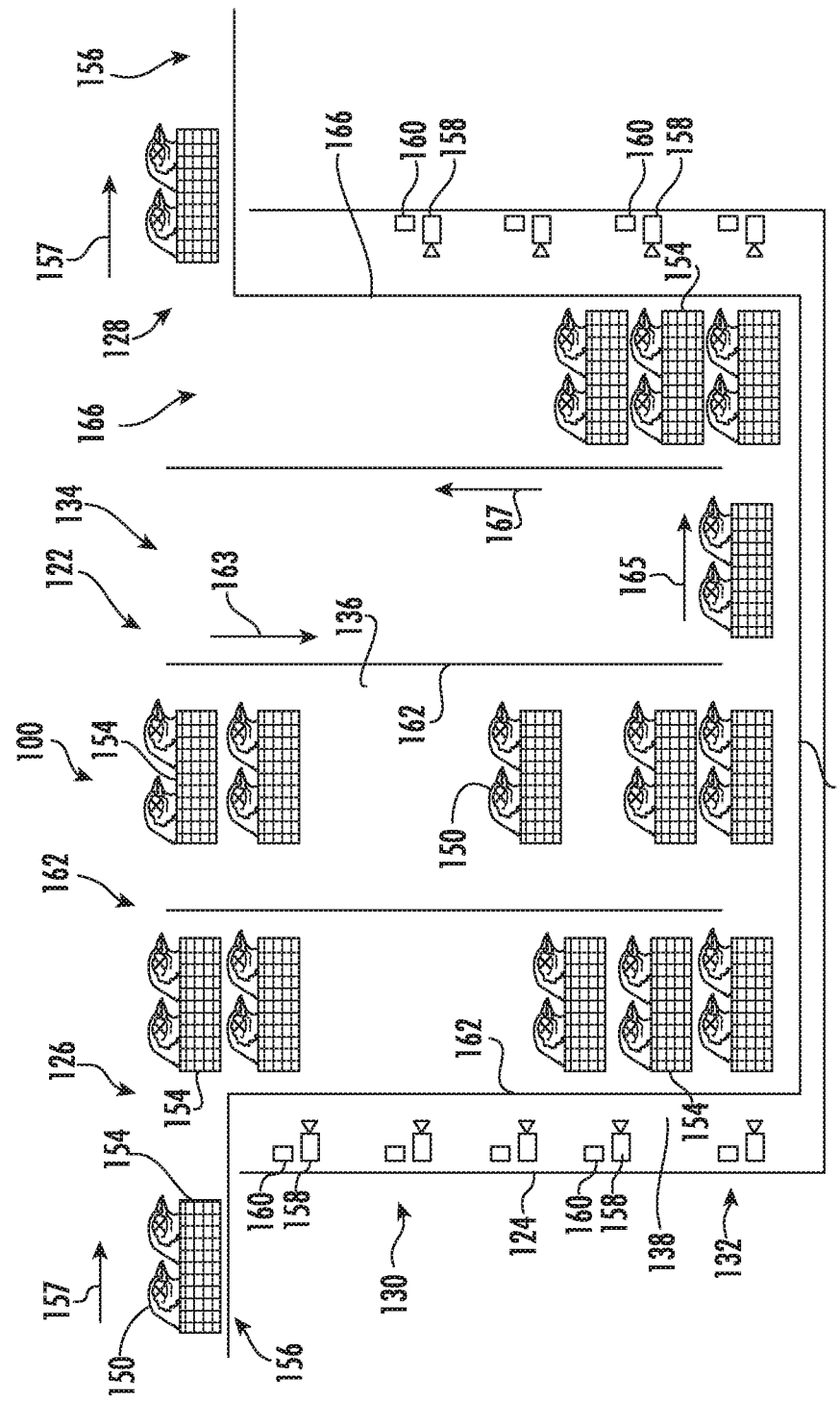
FIG. 6 is an elevation view of an alternative embodiment of an environment of the disclosed subject matter.
Figure 8:
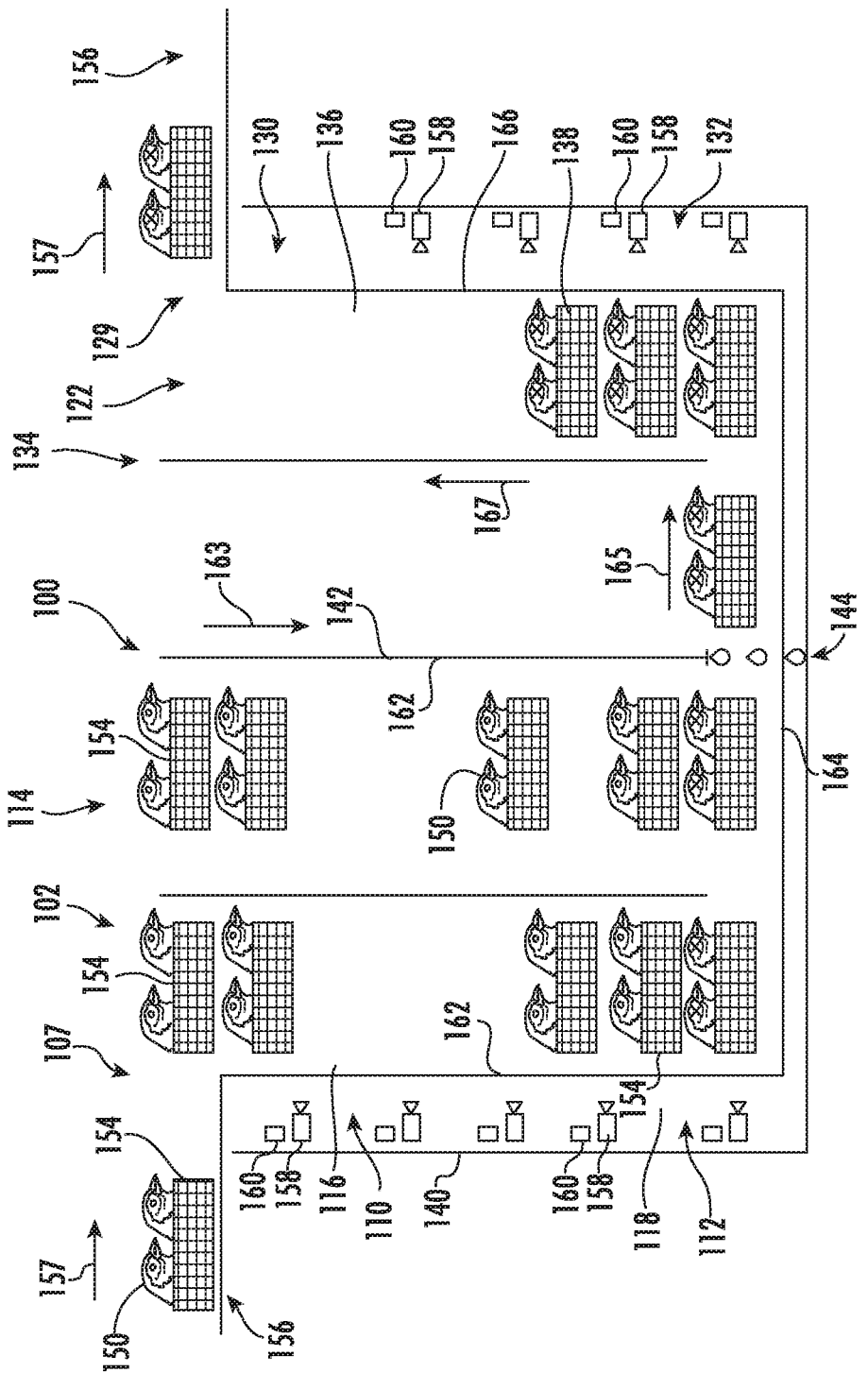
FIG. 8 is an elevation view of an alternative embodiment of an environment of the disclosed subject matter.

Animal 150 processing begins with module unloading 174 whereby the crates 154, and unnumbered crates of animals 150 are placed on a conveyor 156, such as an endless conveyor, and the conscious animals 150 are advanced into the first environment 102. In an embodiment, stunning 176 consists of a first phase 178 having a first environment 102. The first environment 102 consists of an enclosure 104 for containing gases. The enclosure 104 has an inlet 106 allowing the crates 154 to enter the enclosure 104 and first travel vertically within the enclosure 104 on a descending run 162 of the conveyor 156. The crates 154 next move laterally within the enclosure 104 on a lateral run 164, and exit the enclosure 104 at an outlet 108 after traveling vertically on an ascending run 166 of the conveyor 156. In an implementation, the system 100 has a conveyor 156 with a single descending run 162, single lateral run 164, and single ascending run 166. In an implementation, the system 100 has conveyors 156 with two or more descending runs 162 as shown in FIGS. 5, 6, and 8. In another implementation, the system 100 has conveyors 156 with two or more side-by-side conveyors 156, each having two descending runs 162, thereby having a total of four descending runs 162, two lateral runs 164, and two ascending runs 166. In an implementation, the system 100 has a plurality of conveyors 156.

Referring to FIG. 5, the first environment 102 forms a first airspace 114, defined by the enclosure 123, extending between a top 110 area and a bottom 112 area, the airspace 114 forming an upper zone 116 above a lower zone 118. The conveyor 156, moving in the direction of arrow 157, moves each crate 154, including the unnumbered crates, into the first environment 102 with the animals 150 first moving into the upper zone 116. The descending run 162 of the conveyor 156, moving in direction of arrow 163, moves the animals 150 from the top 110 area to the bottom 112 area through the first environment 102 from the upper zone 116 to the lower zone 118.

A first gas is supplied within the first airspace 114. In an embodiment, the first gas is carbon dioxide in combination with ambient air. In an embodiment, the gases supplied within the first airspace 114 along with the first gas includes a mixture of gases. For example, in an implementation, the gas is a mixture of carbon dioxide, ambient air, and oxygen gas. In an implementation, the carbon dioxide concentration is about 40%. Exposing the animals 150 to a carbon dioxide concentration of 40% for one minute is enough to stun the animals 150. A 40% carbon dioxide concentration is necessary to render most animals 150 (including poultry) unconscious. In an implementation, the carbon dioxide concentration is about 40% and the oxygen concentration is between about 20% and about 22%. The addition of oxygen gas to the carbon dioxide and ambient air mixture decreases the gasping response of the animals 150 due to the high concentration of carbon dioxide. In the exemplary implementation, the oxygen gas can be replaced with nitrous oxide gas, argon gas, helium gas, or ozone gas. Alternatively, in an implementation, the sole gas is helium gas, nitrous oxide gas, or argon gas.

Figure 7:
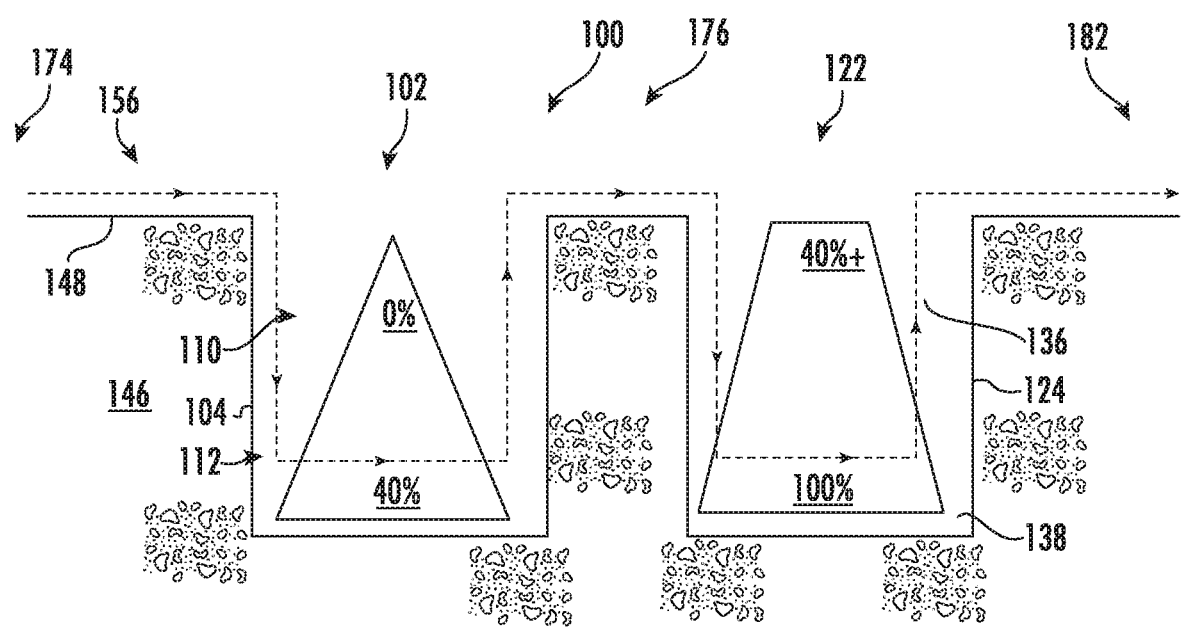
FIG. 7 is an elevation view of an alternative embodiment of an environment of the disclosed subject matter showing the environments below ground.

Movement of the conveyor 156 and crates 154 through the first airspace 114 causes a mixing of the gases within the first airspace 114 resulting in a general gradient of gases forming within the first airspace 114. For example, carbon dioxide is heavier than ambient air, and carbon dioxide tends to form a vertical gradient within the first airspace 114 upon mixing of the carbon dioxide. In an implementation, the carbon dioxide in the first environment 102 ranges in concentration from about 0% at the top 110 area to about 40% at the bottom 112 area (FIG. 7). In an implementation, the carbon dioxide concentration at the bottom 112 area is at least 40%. In an implementation, the carbon dioxide concentration at the bottom 112 area is between about 35% to 40%. It is known in the art that passing an animal through a gradient of carbon dioxide gas that increases in concentration to about 40% within about 3 to 5 minutes in order to render the animals unconscious avoids adverse reactions or trauma to the animals. The first environment 102 is monitored by one or more sensors 160 located within the first enclosure 102 for measuring environmental conditions, such as gas sensors for measuring the presence and concentration of gases, temperature sensors, and humidity sensors. The sensors 160 are spaced throughout the first airspace 114 to measure environmental conditions at locations within the vertical gradient. The condition of the animals 150 as they travel through the first environment 102 is monitored by one or more imaging devices, such as a camera 158, spaced throughout the gradient. The sensors 160 and cameras 158 are operably connected to a programmable logic computer adapted to control movement and speed of the conveyor 156 through the environment, the speed of the descending runs 162, lateral runs 164, and ascending runs 166 of the conveyor, and the volume and concentration of gasses in the environment.

Upon reaching the bottom 112 area, the animals 150 have resided within the first environment 102 between about 2.5 minutes to about 5.5 minutes, preferably about 3 minutes to about 5 minutes, and are rendered unconscious. The slow and gradual movement of the crates 154 from the upper zone 116 to the lower zone 118 minimizes unwanted stress on the animals 150, such as convulsions and gasping, and unwanted injuries from jumping or flopping, such as wing damage, bleeding of the tissues or joints, or blood spots. The crates 154 then move along a lateral run 164 of the conveyor 156, moving in direction of arrow 165, from beneath the descending run 162 to beneath the ascending run 166. The crates 154 ascend from the bottom 112 area to the top 110 area along the ascending run 166 of the conveyor 156 moving in direction of arrow 167, and exit the first environment 102 through the outlet 108. In an implementation, the movement of each crate 154 along the descending run 162, and in turn the movement of the animals 150, through the first airspace 114 is at a first speed, and the movement of the crate 154 and animals 150 along the ascending run 166 is at a second speed. In an embodiment, the second speed is greater than the first speed. In an implementation, the ascending run 166 travels twice as fast as the descending run 162. In an implementation, the first speed results in a travel time of the animal 150 along the descending run 162 within the first airspace 114 of between about 3 minutes to about 5 minutes.

In an embodiment, each crate 154 moves from the first phase 178 or first environment 102 immediately to slaughtering 182. An advantage of the first and second environment controlled atmospheric stunning system 100 is the ability to optionally move the unconscious animals 150 immediately to slaughtering 182 after traveling through the first environment 102 thereby allowing alternative processing methods to take place, such as halal processing 179. In another embodiment, the animals 150 move from the first phase 178 or first environment 102 immediately to a second phase 180 or second environment 122 to be rendered irrevocable unconscious prior to slaughter 182 (FIG. 7).

Referring to FIG. 6, the second environment 122 consists of an enclosure 124 for containing gases for an optional second phase 180 of the stunning 176 operation. The second environment 122 includes sensors 160 and cameras 158 operably connected to a programmable logic computer for controlling the conveyor 156 and gases similar to the first environment 102. The enclosure 124 has an inlet 126 allowing the crates 154 to enter the enclosure 124 on a descending run 162 of the conveyor 156, moving laterally within the enclosure 124 on a lateral run 164, and exiting the enclosure 124 after an ascending run 166 of the conveyor 156 at an outlet 128. The second environment 122 forms a second airspace 134 extending between a top 130 area and a bottom 132 area, the airspace 134 forming an upper zone 136 above a lower zone 138.

The conveyor 156, moving in the direction of arrow 157, moves each crate 154, including the unnumbered crates, from the first environment 102 into the second environment 122 with the unconscious animals 150 first moving into the upper zone 136 of the second environment 122. The descending run 162 of the conveyor 156, moving in direction of arrow 163, moves the animals 150 from the top 130 area to a bottom 132 area through the second environment 122 from the upper zone 136 to the lower zone 138. The speed of the conveyor 156 during the descending run 162, lateral run 164, and ascending run 166, determines the dwell time of the animals 150 within the first and second environments 102, 122.

A second gas is supplied within the second airspace 134. As with the first airspace 114, a combination of gases may be used in the second airspace 134 forming gradients of concentration due to movement of the conveyor 156 and crates 154 through the second airspace 134, and such gases and combinations of gases are incorporated herein. In an embodiment, the second gas is carbon dioxide and forms a concentration within the lower zone 138 of about 100% (FIG. 7). In an implementation, the carbon dioxide concentration at the bottom 132 area is between about 40% up to 100%. Exposing the animals 150 to a concentration of carbon dioxide gas of about 40% concentration or greater, for a period of time will render the animals 150 irrevocably unconscious. In an implementation, the sole gas is helium gas. Similar to the first environment 102, the second environment 122 includes one or more gas sensors 160 for monitoring the environmental conditions, such as gas presence and concentration, within the second environment 122, and one or more imaging devices, such as cameras 158 for monitoring the condition of the animals 150. Upon reaching the bottom 132 area, the animals 150 have resided within the second environment 122 for between about 1.5 to 2 minutes and are rendered irrevocably unconscious upon reaching the bottom 132 area. The crates 154 then move along a lateral run 164 of the conveyor 156, in the direction of arrow 165, from beneath the descending runs 162 to beneath the ascending run 166. The crates 154 ascend from the bottom 132 area to the top 130 area along the ascending run 166 in the direction of arrow 167, and exit the second environment 122 through an outlet 128. In an implementation, the movement of each crate 154 along the descending run 162, and in turn the movement of the animals 150, through the second airspace 134 is at a first speed, and the movement of the crate 154 and animals 150 along the ascending run 166 is at a second speed. In an embodiment, the second speed is greater than the first speed. In an implementation, the ascending run 166 travels twice as fast as the descending run 162. In an implementation, the first speed results in a travel time of the animal 150 within the second airspace 134 of between about 1.5 minutes and 2 minutes. Upon exiting the second environment 122, the animals 150 move to slaughtering 182.

Processing animals 150 first through the first environment 102 followed by the second environment 122 results in this animals 150 traveling the descending run 162 of the second environment 122 at a faster rate than they travel along the descending run 162 of the first environment 102. Stated alternatively, the animals 150 reside or dwell in the first environment 102 for a greater amount of time than in the second environment 122.

Figure 10:
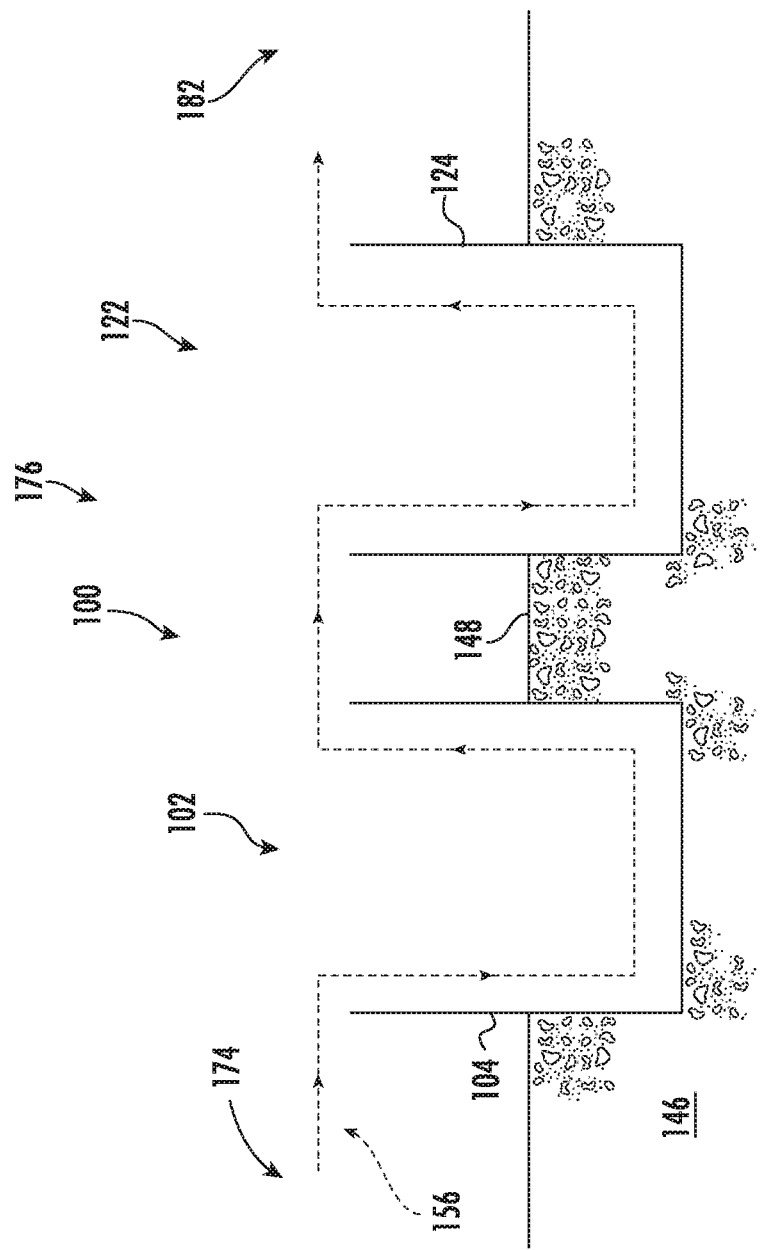
FIG. 10 is an elevation view of an embodiment of an environment of the disclosed subject matter showing the environments partially above ground.
Figure 11:
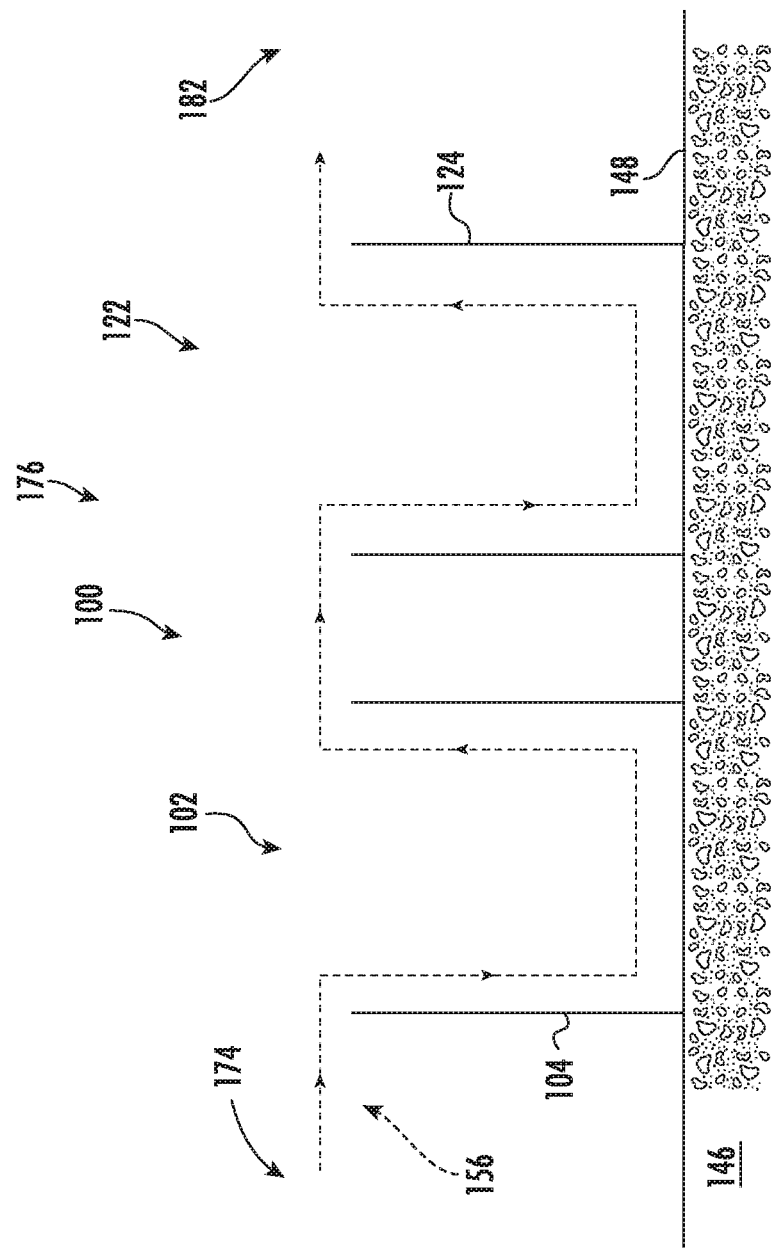
FIG. 11 is an elevation view of an embodiment of an environment of the disclosed subject matter showing the environments above ground.

In an embodiment, the environments 102, 122 are entirely below the floor 148 of the facility, whereby the enclosures 104, 124, and 140 are surrounded by the ground 146, forming open-top pits, constructed entirely of reinforced concrete (FIG. 7). In an embodiment, the environments 102, 122 are partially below the floor 148 of the facility, whereby the enclosures 104, 124, and 140 are constructed partially or entirely of reinforced concrete (FIG. 10). In an embodiment, the environments 102, 122 are entirely above ground 146 and the enclosures 104, 124, and 140 are constructed of reinforced concrete (FIG. 11). In an implementation, the enclosures 104, 124, and 140 include thermal insulation to allow temperature control of the environments 102, 122. In an implementation, in each of enclosures 104, 124, and 140 the distance between the top and bottom is about ten feet. In another embodiment, the vertical distance between the top and bottom of enclosure 124 is less than the distance between the top and bottom of enclosure 104, such as the vertical distance in the second enclosure 124 is about five feet, and the vertical distance in the first enclosure 104 is about ten feet. In some implementations, the enclosures 104, 124, and 140 are sealed to prevent gases from escaping into the atmosphere. Accordingly, the inlets 106, 107, and 126, and outlets 108, 128, and 129 are constructed to allow the crates 154 and conveyor 156 to pass through, such as by a moveable sealed door.

Figure 9:
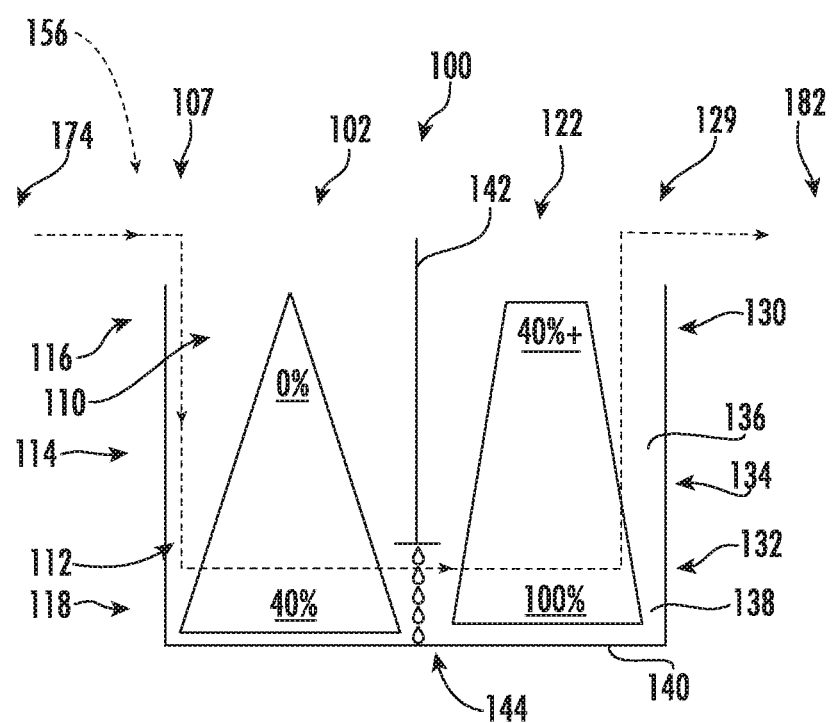
FIG. 9 is an elevation view of an alternative embodiment of an environment of the disclosed subject matter.

Referring to FIGS. 8-9, in an embodiment, the first environment 102 and second environment 122 are within a single enclosure 140, and the environments 102, 122 are formed or partially separated by a divider 142 and separator. The conveyor 156, moving in the direction of arrow 157, moves each crate 154, including the unnumbered crates, into the first environment 102 within the enclosure 140 through an inlet 107. The descending runs 162 of the conveyor 156, moving in direction of arrow 163, transits the first environment 102 from the top 110 area to the bottom 112 area through the upper zone 116 and the lower zone 118 of the first airspace 114. The first environment 102 is supplied with a gas, and the gas forms a vertical gradient in concentration due to a mixing of the gas by movement of the crates 154, etc. as described above.

In an implementation, the carbon dioxide in the first environment 102 ranges in concentration from about 0% at the top 110 area to about 40% at the bottom 112 area (FIG. 9). In an implementation, the carbon dioxide concentration at the bottom 112 area is at least 40%. In an implementation, the carbon dioxide concentration at the bottom 112 area is between about 35% to 40%. It is known in the art that passing an animal through a gradient of carbon dioxide gas that increases in concentration to about 40% within about 3 to 5 minutes in order to render the animals unconscious avoids adverse reactions or trauma to the animals. Upon reaching the bottom 112 area, the animals 150 have resided within the first environment 102 between about 2.5 minutes to about 5.5 minutes, preferably about 3 minutes to about 5 minutes, and are rendered unconscious.

The crates 154 then move on a lateral run 164 of the conveyor 156, in the direction of arrow 165, from the lower zone 118 beneath the descending runs 162 to the lower zone 138 beneath the ascending run 166, passing from the first environment 102 to the second environment 122 beneath the divider 142. In an embodiment, a separator depends from the divider 142, such as a water screen 144, separates the first environment 102 bottom 112 area from the second environment 122 bottom area thereby keeping the gases within the environments 102, 122 separated. In an embodiment, the water screen 144 includes antimicrobial agents, such as ozonated water, cleaning the animals 150 and treating any active microbial processes.

Within the second environment 122 a second airspace 134 extends between a top 130 area and a bottom 132 area forming an upper zone 136 above the lower zone 138. The gases within this second environment 122 are the gases and combination of gases described above with respect to the second environment 122.

In an embodiment, the second gas is carbon dioxide and forms a concentration within the lower zone 138 of about 100% (FIG. 9). In an implementation, the carbon dioxide concentration at the bottom 132 area is between about 40% up to 100%. In an implementation, the sole gas is helium gas. Upon reaching the bottom 132 area, the animals 150 have resided within the second environment 122 for between about 1.5 to 2 minutes and are rendered irrevocably unconscious upon reaching the bottom 132 area.

The crates 154 move from the bottom 132 to the top 130 along the ascending run 166 in the direction of arrow 167 and exit the second environment 122 through an outlet 129 onward to slaughtering 182. The first and second environments 102, 122 include cameras 158 and sensors 160 as described above. In an implementation, the movement of each crate 154 along the descending run 162, and in turn the movement of the animals 150, through the first airspace 114 is at a first speed, and the movement of the crate 154 and animals 150 along the ascending run 166 through the second airspace 134 is at a second speed. In an embodiment, the second speed is greater than the first speed. In an implementation, the first speed results in a travel time of the animal 150 within the first airspace 114 of between about 3 minutes to about 5 minutes, and the second speed results in a travel time of the animal 150 within the second airspace 134 of between about 1.5 minutes to about 2 minutes.

After slaughtering 182, the animals 150 move on to subsequent stages of processing, including chilling 184, processing 186, packaging 188, storage 190, and shipping 192. Processing 186 may include cut-up, deboning, and grading.

The bi-phasal continuous flow system described above with regard to the controlled atmospheric stunning system 100 results in gas stunning of the animals 150 with minimal carbon dioxide consumption by the animal 150. In addition, the controlled rate of descent of the animals 150 within the first environment 102 reduces animal 150 damage and improves the quality of the harvested tissues.

It will be appreciated that the stunning system 100 can be used for various other applications. Moreover, the apparatus of the stunning system 100 can be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

Having described the disclosed subject matter, what is claimed as new and desired to be secured by Letters Patent is:

1. A method of gas stunning an animal prior to slaughter, comprising:
   providing an enclosure with a first environment adjacent a second environment, the first and second environments separated by a divider and a separator;
   wherein the first environment extends between a top area and a bottom area, with a first airspace extending between the top area and the bottom area;
   supplying the first airspace with a first gas, wherein the first gas increases in concentration within the first airspace from the top area to the bottom area;
   wherein the second environment extends between a top area and a bottom area, with a second airspace extending between the top area and the bottom area;
   supplying the second airspace with a second gas, wherein the second gas has a concentration within the second airspace at the bottom area between about 40% and up to 100%;
   advancing an animal through the first environment from the top area to the bottom area rendering the animal unconscious;
   advancing the animal from the first environment bottom area, through the separator, to the second environment bottom area; and
   advancing the animal from the second environment bottom area to the second environment top area rendering the animal irrevocably unconscious.

2. The method of claim 1, wherein the separator comprises a water screen.

3. The method of claim 2, wherein the water screen includes ozonated water.

4. The method of claim 1, further comprising:
   wherein the animal is advanced through the first environment at a first speed; and
   wherein the animal is advanced through the second environment at a second speed, wherein the second speed is greater than the first speed.

5. The method of claim 4, wherein the second speed is double the first speed.

6. The method of claim 1, wherein the distance between the top area and the bottom area of the first environment is greater than the distance between the top area and the bottom area second environment.

7. The method of claim 1, wherein the enclosure is above ground.

* * * * *